(No Model.)

E. KITZ.
ADVERTISING DEVICE FOR CARS.

No. 288,578. Patented Nov. 13, 1883.

WITNESSES.
H. J. Browning
Morris Solomon

INVENTOR.
Ernest Kitz per Smith & Loeper
attys.

United States Patent Office.

ERNEST KITZ, OF INDIANAPOLIS, INDIANA, ASSIGNOR OF ONE-HALF TO JACOB W. LOEPER, OF SAME PLACE.

ADVERTISING DEVICE FOR CARS.

SPECIFICATION forming part of Letters Patent No. 288,578, dated November 13, 1883.

Application filed February 14, 1883. (No model.)

*To all whom it may concern:*

Be it known that I, ERNEST KITZ, of the city of Indianapolis, county of Marion, and State of Indiana, have invented certain new and useful Improvements in Display-Cards for Street-Cars, of which the following is a specification.

My invention relates to improvements in display-cards for street-cars.

The object of my invention is to provide a canvas belt to move on pulleys, with mechanical arrangements for moving the same, and thus bringing into view alternately the various signs, cards, or notices printed thereon. I attain these objects by means of the combination of mechanical principles hereinafter described.

Figure 1:
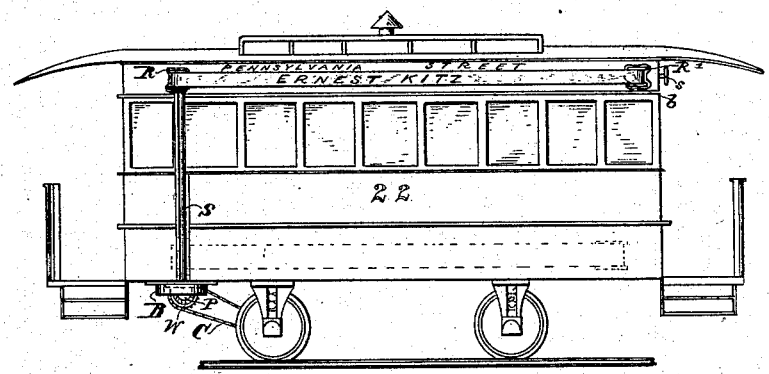
Figure 2:
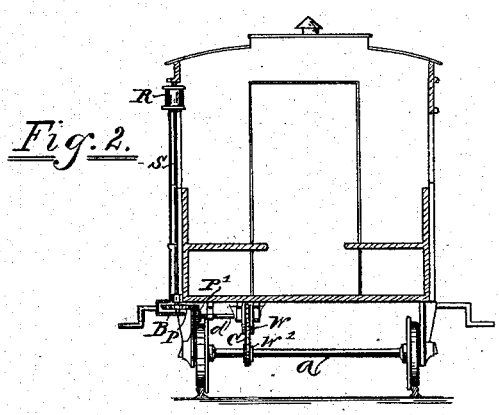
Figure 3:
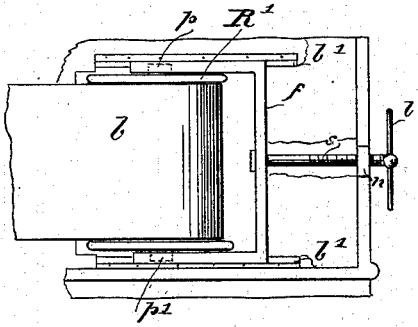
Figures 4, 5:
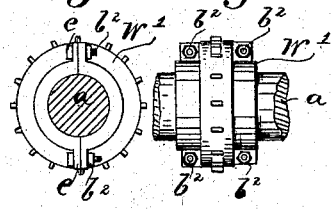
Figure 6:
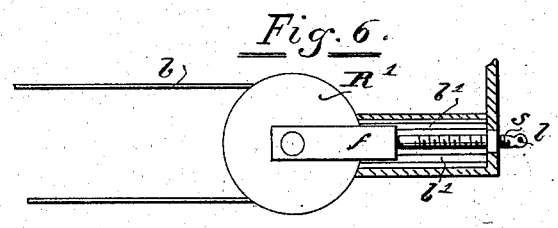

In the accompanying drawings, which are made a part of this specification, and in which similar letters of reference refer to similar parts of my invention, Figure 1 represents an elevation of a street-car with my device attached. In Fig. 2, $a$ is the axle of a car-wheel, on which is mounted a chain-wheel, W', with sprockets to receive the links of the endless chain C successively, by means of which power is communicated to chain-wheel W, mounted on a shaft, $d$, attached by means of hangers to the bottom of the street-car, and provided with bevel cog-wheel P', to engage with bevel cog-wheel P, mounted on the upright shaft S, supported at each end by means of journaled boxes to the sides of the car, said shaft S extending upward to the place of display, and there provided with a flanged pulley, R, around which pulley a belt of canvas, $b$, passes, which belt, extending to the opposite end of the car, revolves on the adjustable pulley R'. Fig. 3 represents an enlarged side view of the adjustable pulley R', attached to the street-car, said pulley being pivoted at $p$ and $p'$ to sliding frame $f$, which frame slides transversely between bars $b'$ $b'$, and is provided with an adjusting-screw, S, provided with stationary nut $n$ and handle $l$, by means of which the pulley R' is adjusted to the length of the canvas belt. Fig. 6 represents a plan view of Fig. 3 and a portion of the belt $b$. Fig. 4 represents an enlarged side view of the chain-wheel W', said wheel being constructed in halves, with flanged ears $e$ to receive bolts $b^2$, by means of which said halves are united, forming a complete wheel, as shown in Fig. 4. Fig. 5 is a plan view of Fig. 4.

The various parts of my device are to be constructed of any proper material and the mechanical parts concealed from view by any proper means, preferably as indicated in Fig. 2 by letter B.

The canvas belt $b'$ being supplied with the desired display-cards, and stretched over the pulleys R R', and brought to the proper tension by means of the adjustable screw S, the operation of my device is as follows: When the car is in motion, the axle $a$, supplied with chain-wheel W', will revolve, imparting motion to endless chain C, which actuates the chain-wheel W. This wheel, being mounted on the shaft $d$, turns the bevel-wheel P', engaging with bevel-wheel P, mounted on upright shaft S, imparting motion to pulley R, on which the canvas belt $b$ revolves, thus bringing into view of parties inside as well as outside of the cars the various signs, cards, or notices attached to the canvas belt alternately.

Having thus fully described my invention, its purposes and uses, what I claim as new, and desire to secure by Letters Patent, is—

A chain-wheel, W', provided with sprockets and made in two halves, to be attached to the axle $a$ of any street-car by means of bolts $b^2$ $b^2$ passing through flanged ears $e$ $e$, rigidly attached to the two halves of same wheel, W', to impart motion through endless chain C to chain-wheel W, provided with bevel-gearing P P', and firmly attached to upright shaft S, supplied at the upper end with flanged pulley R, supporting one half of canvas belt $b$, the other half of which moves on flanged pulley R', supported by sliding frame $f$, provided with bars $b'$ $b'$, adjusting-screw S, nut $n$, and handle $l$, all in combination, substantially in the manner and for the purpose set forth.

In witness whereof I have hereunto set my hand and seal, at Indianapolis, Indiana, this 10th day of February, A. D. 1883.

ERNEST KITZ. [L. S.]

In presence of—
 MORRIS SOLOMON,
 W. J. BROWNING.